(12) United States Patent
Uy et al.

(10) Patent No.: US 11,245,527 B2
(45) Date of Patent: Feb. 8, 2022

(54) SECURE DISTRIBUTION NETWORKS

(71) Applicant: Seagate Technology LLC, Cupertino, CA (US)

(72) Inventors: Vincent Uy, Singapore (SG); Nino Wicaksono, Singapore (SG); Saravanan Nagarajan, Singapore (SG); Kwong Heng Alphonsus John Kwok, Singapore (SG); Kian Beng Lim, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 202 days.

(21) Appl. No.: 16/669,307

(22) Filed: Oct. 30, 2019

(65) Prior Publication Data

US 2021/0135870 A1 May 6, 2021

(51) Int. Cl.
*H04L 9/32* (2006.01)
*H04L 29/06* (2006.01)
*H04L 9/08* (2006.01)

(52) U.S. Cl.
CPC .......... *H04L 9/3218* (2013.01); *H04L 9/0852* (2013.01); *H04L 63/0435* (2013.01)

(58) Field of Classification Search
CPC ... H04L 9/32; H04L 9/08; H04L 29/06; H04L 9/00; H04L 9/0852; H04L 63/0435; H04L 9/3218; H04L 9/0894; H04K 1/00; H04M 1/70; G07C 9/37; G06K 9/00885
See application file for complete search history.

(56) References Cited

U.S. PATENT DOCUMENTS

| | | | | |
|---|---|---|---|---|
| 6,490,680 B1 * | 12/2002 | Scheldt | ............... | H04L 63/0442 380/286 |
| 7,814,320 B2 * | 10/2010 | Mackenzie | ............. | H04L 63/12 713/168 |
| 7,827,223 B2 | 11/2010 | Gressel et al. | | |

(Continued)

FOREIGN PATENT DOCUMENTS

| | | |
|---|---|---|
| EP | 0895149 | 9/2003 |
| WO | 2010010430 | 1/2010 |
| WO | 2019086553 | 5/2019 |

*Primary Examiner* — Thanhnga B Truong
(74) *Attorney, Agent, or Firm* — Holzer Patel Drennan

(57) ABSTRACT

Secure distribution of data objects using a unique quantum-safe cryptographic key provided to a user requesting the data object that has been authenticated using a zero-knowledge authentication. A user may access the system by way of the zero-knowledge authentication to request access to a data object of a data library. The system may generate and associate a unique quantum-safe cryptographic key for the instance of the data library to be provided to the authenticated user. The data object is encrypted using the unique quantum-safe cryptographic key. The encrypted data object and the unique quantum-safe cryptographic key are provided to the authenticated user. Other instances of the data object may also be encrypted with other unique quantum-safe cryptographic keys. In turn, access to a unique quantum-safe cryptographic key may not be useful in decrypting other instances of the data object, and other data objects may not be decrypted using a given unique key for a given data object instance.

24 Claims, 7 Drawing Sheets

(56) References Cited

U.S. PATENT DOCUMENTS

| | | | |
|---|---|---|---|
| 8,046,589 B2 * | 10/2011 | Akkermans | G07C 9/37 |
| | | | 713/186 |
| 8,650,401 B2 * | 2/2014 | Wiseman | H04L 9/0855 |
| | | | 713/171 |
| 2001/0029581 A1 * | 10/2001 | Knauft | H04L 9/3247 |
| | | | 713/193 |
| 2015/0295708 A1 * | 10/2015 | Howe | H04L 9/0858 |
| | | | 380/28 |
| 2017/0317823 A1 | 11/2017 | Gandhi | |
| 2019/0044922 A1 | 2/2019 | Schultz et al. | |

* cited by examiner

SECURE DISTRIBUTION NETWORKS

BACKGROUND

The security of data exchanged between parties is of critical importance. A number of protocols, including cryptographic protocols, have been proposed for use in securing the exchange of data between parties. Specifically, protocols have been developed for use in the exchange of information between parties using a communication network such as the Internet. Examples of such protocols include Transport Layer Security (TLS), among others.

Despite advances in protocols to safeguard the exchange of data between parties (e.g., including protections for private, authenticated, and reliable data communication), malicious actors continue to develop attacks that may circumvent protections of existing security protocols. Furthermore, theorized advancements in computing capacity are anticipated that would render some existing security protocols obsolete. For example, upon realization of quantum computing, existing protocols may suffer from vulnerabilities that are currently not present due to current limitations on computing capacity. In turn, continued advances for the exchange of data using secure protocols are needed to maintain data integrity and provide post-quantum safe approaches for data exchange.

SUMMARY

The present disclosure generally relates to systems and methods for the secure distribution of data objects. The disclosure includes the secure distribution of a data object that includes authenticating a user using a zero-knowledge authentication protocol. The secure distribution of the data object also includes associating a unique quantum-safe key with a data object requested by the authenticated user and encrypting the data object with the unique quantum-safe key. The secure distribution includes releasing the unique quantum-safe key to the authenticated user and providing access to the encrypted data object to the authenticated user. The unique quantum-safe key is exclusively operative to decrypt the encrypted data object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

The present disclosure relates to the secure distribution of a data object from a secure distribution system. Specifically, the present disclosure contemplates approaches that may facilitate robust security in a post-quantum context. It is theorized that quantum computing capability will be developed that massively increases the computational capacity of computing systems. In view of this increased computational capacity, some current security protocols may no longer provide robust security. For example, some current security protocols may be compromised by improved "brute-force" attacks facilitated by the massively increased computing capacity theorized for quantum computers. Thus, a "post-quantum safe" approach as described herein may be one in which security of the protocol may be maintained even in the presence of massively increased computational capacity, such as those theorized with the advent of quantum computing.

For example, the current Transport Layer Security (TLS) protocol is utilized in many contexts to secure communication between parties. TLS secures data in motion yet relies on asymmetric cryptographic keys that are susceptible to being compromised by a quantum computer. Thus, it is recognized that continued use of the TLS protocol may not be safe where quantum computing capacity is achieved.

Figure 1:
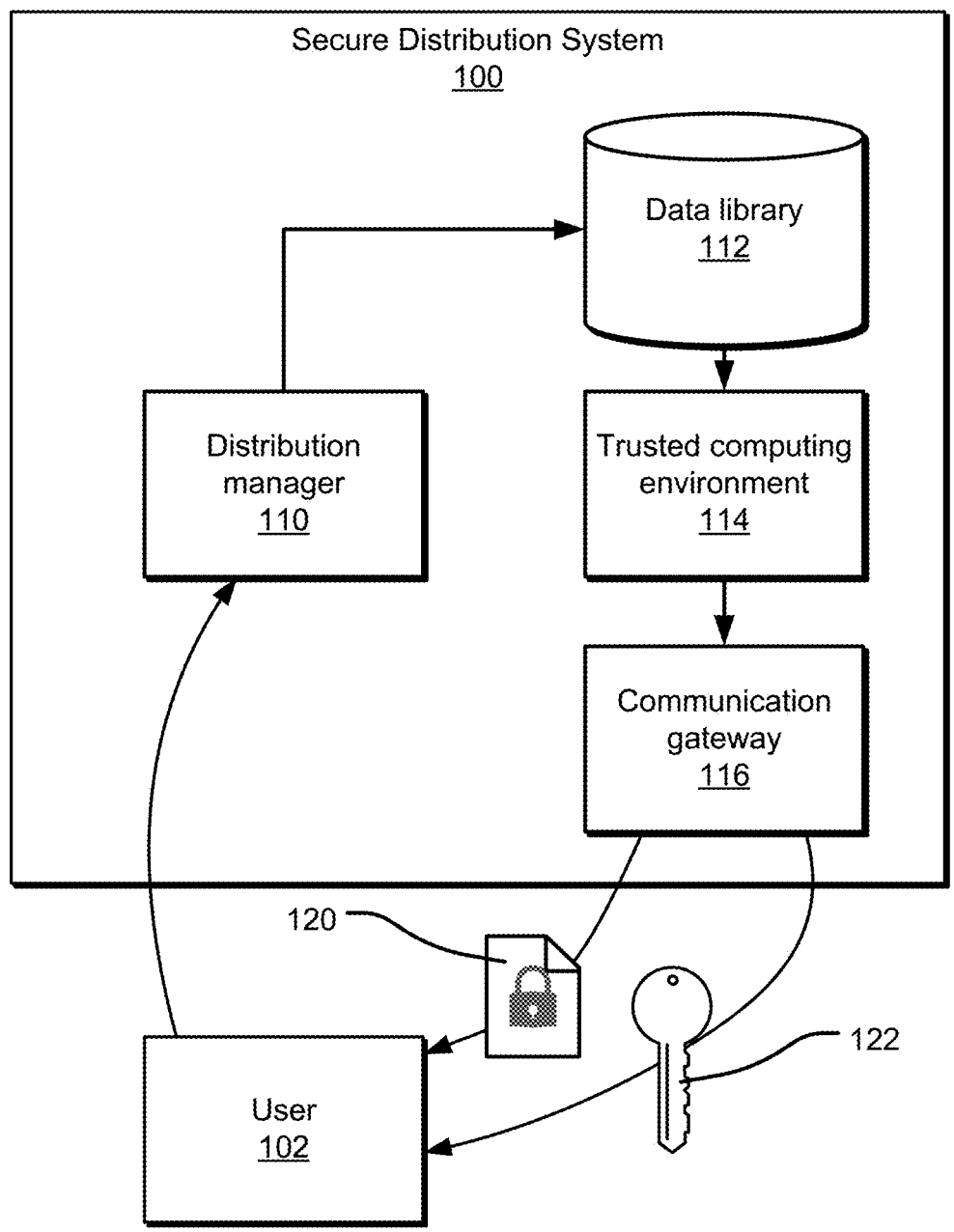
FIG. 1 depicts an example of a secure distribution system for securely providing an encrypted data object to a user.

With reference to FIG. 1, an example of a secure distribution system 100 is depicted. The secure distribution system 100 includes a distribution manager 110. The distribution manager 110 may be operative to authenticate a user 102 (e.g., using a zero-knowledge authentication as described in greater detail below). A user 102 may request a data object from a data library 112 of the secure distribution system 100. The distribution manager 110 may be in operative communication with the data library 112 that stores one or more data objects. The data library 112 is operative to provide an instance of a requested data object to a trusted computing environment 114. As described in greater detail below, the trusted computing environment 114 is operative to utilize a unique quantum-safe cryptographic key to encrypt the instance of the requested data object from the data library 112. In turn, an encrypted data object instance 120 and a corresponding unique quantum-safe cryptographic key 122 may be provided to a user 102 by way of a communication gateway 116.

Figure 2:
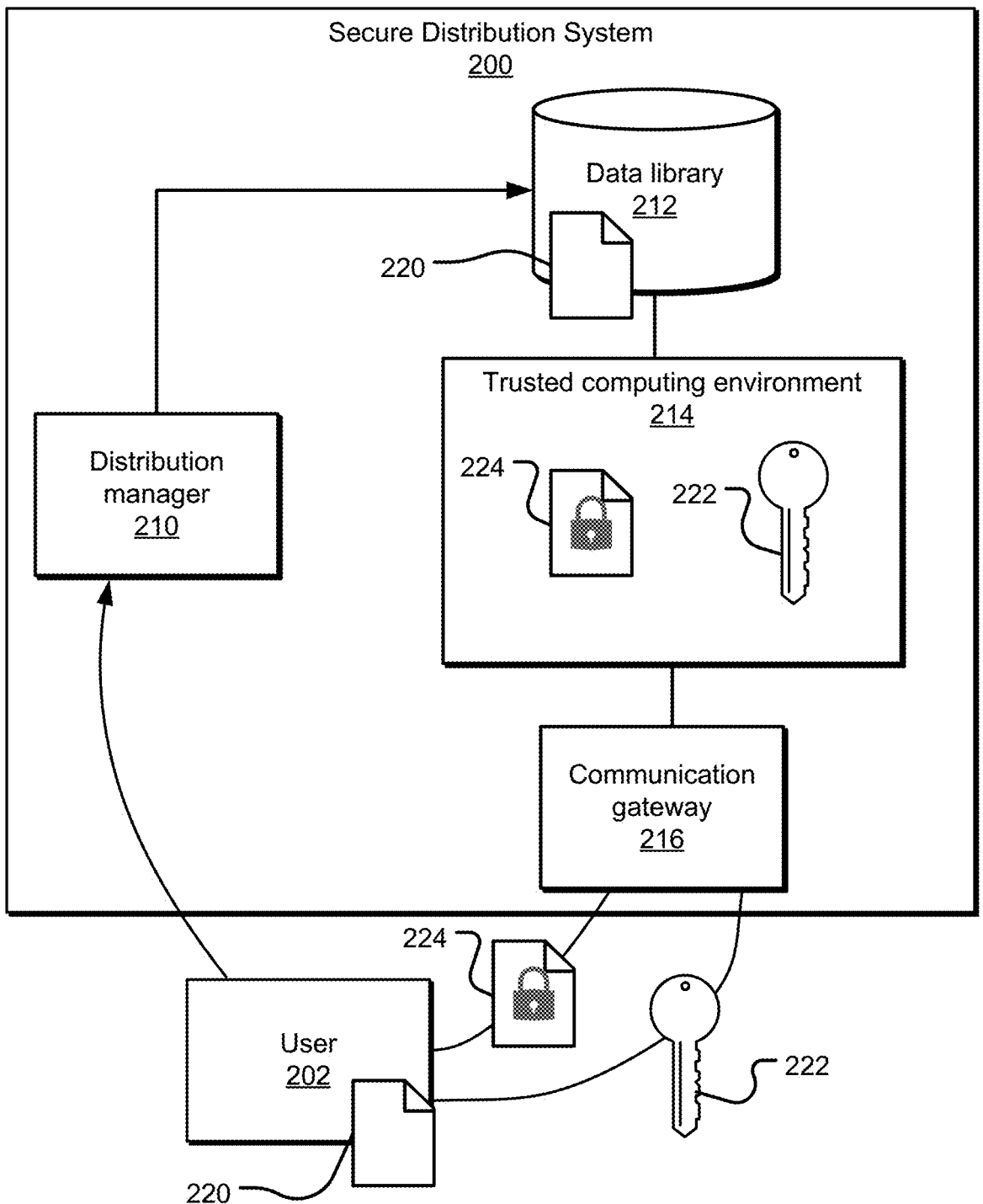
FIG. 2 depicts another example of a secure distribution system according to the present disclosure.

With reference to FIG. 2, a more detailed example of a secure distribution system 200 is depicted. In the secure distribution system 200, a user 202 may communicate with a distribution manager 210 to authenticate the user 202. Specifically, it is contemplated that authentication of the user 202 may be provided by way of zero-knowledge authentication. In this regard, the distribution manager 210 may include or be in operative communication with an authentication module to perform the zero-knowledge authentication.

Zero-knowledge proof of knowledge generally refers to protocols that allow an entity to provide proof of knowledge of a secret to another entity without providing the secret to the other entity. A specific instance of zero-knowledge proof of knowledge may be provided for user authentication by way of a zero-knowledge password proof. In a zero-knowledge password proof, a user may demonstrate knowledge of a password to another entity without providing the other entity the identity of the password. A number of zero-knowledge password proofs have been proposed including protocols described in Internet Engineering Task Force (IETF) Request for Comment (RFC) 2945, Institute of Electrical and Electronics Engineers (IEEE) Standard P1363.2, and International Organization for Standardization (ISO) and the International Electrotechnical Commission (IEC) Standard 11770-4. These standards may include, among other approaches, a Secure Remote Password Protocol (SRP) that uses the SHA-1 hashing function. Other protocols may include traditional public-key cryptography, lattice-based public-key cryptography, password-based public-key cryptography, and identity-based public-key cryptography using pairings. In other examples, any zero-knowledge password proof or other zero-knowledge proof generally may be used to authenticate a user 202 to the secure distribution system.

Upon authorization of the user 202 to the secure distribution system 200, a request for a data object from the user 202 to the distribution manager 210 may be serviced. The distribution manager 210 may identify a requested data object from a data library 212, which may store one or more data objects. The data library 212 may comprise a secure data space in which data objects are securely stored. A requested data object from the data library 212 may be provided to a trusted computing environment (TCE) 214 of the secure distribution system 200. For example, the TCE 214 may comprise a hardware security module (HSM) that is capable of securely performing cryptographic operations. Other trusted execution environments may also be provided without limitation.

The TCE 214 may access or generate a quantum-safe cryptographic key 222. The quantum-safe cryptographic key 222 may be according to any appropriate quantum-safe protocol or algorithm. For example, one theorized approach that is quantum-safe includes a symmetric cryptographic key with a sufficiently large key size. The key size of such quantum-safe symmetric cryptographic keys may be at least 256 bits, at least 512 bits, or at least 1024 bits. Other post-quantum safe cryptographic approaches may be used for the quantum-safe cryptographic key utilized by the TCE 214 including, but not limited to, lattice-based cryptography, multivariate cryptography, hash-based cryptography, code-based cryptography, supersingular elliptical curve isogeny cryptography, or other appropriate post-quantum cryptography approaches.

In any regard, the TCE 214 may utilize a unique quantum-safe cryptographic key 222 to encrypt a given instance of the data object 220 requested by the user 202. That is, the unique quantum-safe cryptographic key 222 may be uniquely associated with an instance of the data object 220 retrieved from the data library 212 that is to be provided to the user 202. The TCE 214 may associate the unique quantum-safe cryptographic key 222 with the instance of the data object 224 to be provided to the user 202. For instance, the TCE 214 may maintain a ledger or other record regarding the association of respective ones of the unique quantum-safe cryptographic keys with corresponding data object instances. The TCE 214 may encrypt the data object 220 with the quantum-safe cryptographic key 222. In turn, the encrypted data object instance 224 and the unique quantum-safe cryptographic key 222 may be provided to a communication gateway 216 that may provide the encrypted data object 224 and the quantum-safe cryptographic key 222 to the user 202.

The encrypted data object 224 may comprise one of a number of different forms. For example, the encrypted data object 224 may comprise an encrypted electronic data file that is to be transmitted to the user 202 by way of a communication network. In another example, the encrypted data object 224 may comprise physical storage media that includes the encrypted data of the data object. Examples of such physical storage media may include, without limitation, hard drives, flash memory, optical discs, or the like.

In this regard, the communication gateway 216 of the secure distribution system 200 may comprise a number of modalities for providing the encrypted data object 224 and/or the quantum-safe cryptographic key 222 to the user 202. In the context in which the encrypted data object 224 comprises electronic data to be transmitted to the user 202 using a communication network, the communication gateway 216 may include appropriate hardware and/or software to facilitate communication of the encrypted data object 224 to the user 202 using the communication network (e.g., the Internet). In the context in which the encrypted data object 224 comprises physical storage media, the communication gateway 216 may be configured to ship or otherwise physically deliver the physical encrypted data object to the user 202.

It may be appreciated that the encrypted data object 224 and the quantum-safe cryptographic key 222 may be delivered separately to the user 202. As will be described in greater detail below, such separate provisioning of the encrypted data object 224 and the quantum-safe cryptographic key 222 may provide enhanced security against surreptitious attempts to gain unauthorized access to the encrypted data object 224 or other instances of encrypted data objects (e.g., subsequent or prior encrypted data objects that have been cryptographically secured with other unique quantum-safe cryptographic keys other than the quantum-safe cryptographic key 222 associated with the data object 224).

The quantum-safe cryptographic key 222 may be delivered to the user 202 using appropriate secure communication. One example of such includes the use of a separate channel different than the channel used to deliver the encrypted data object 224. The separate channel may employ security protocols, including white box cryptography, TLS with a pre-shared key scheme accepted by the standard, or other security protocol. Furthermore, the separate channel may include a secure physical media device such as a smart card, secure USB drive, or other secure physical media.

In turn, once the user 202 is in possession of the encrypted data object 224 and the unique quantum-safe cryptographic key 222, the unique quantum-safe cryptographic key 222 may be used to decrypt the encrypted data object 224. In turn, the data object may be accessed in plain text by the user 202. The user 202 may, in turn, utilize, modify, or otherwise manipulate the data object 220. As will be described in greater detail below, the user 202 may subsequently provide the data object 220 to the secure distribution system 200 for storage in the data library 212. In this way, an altered version of the data object 220 may be subsequently requested by a user (e.g., user 202 or another user) in which case a new unique quantum-safe cryptographic key may be associated with the subsequent instance of the data object 220 to be provided to the requesting user.

Figure 3:
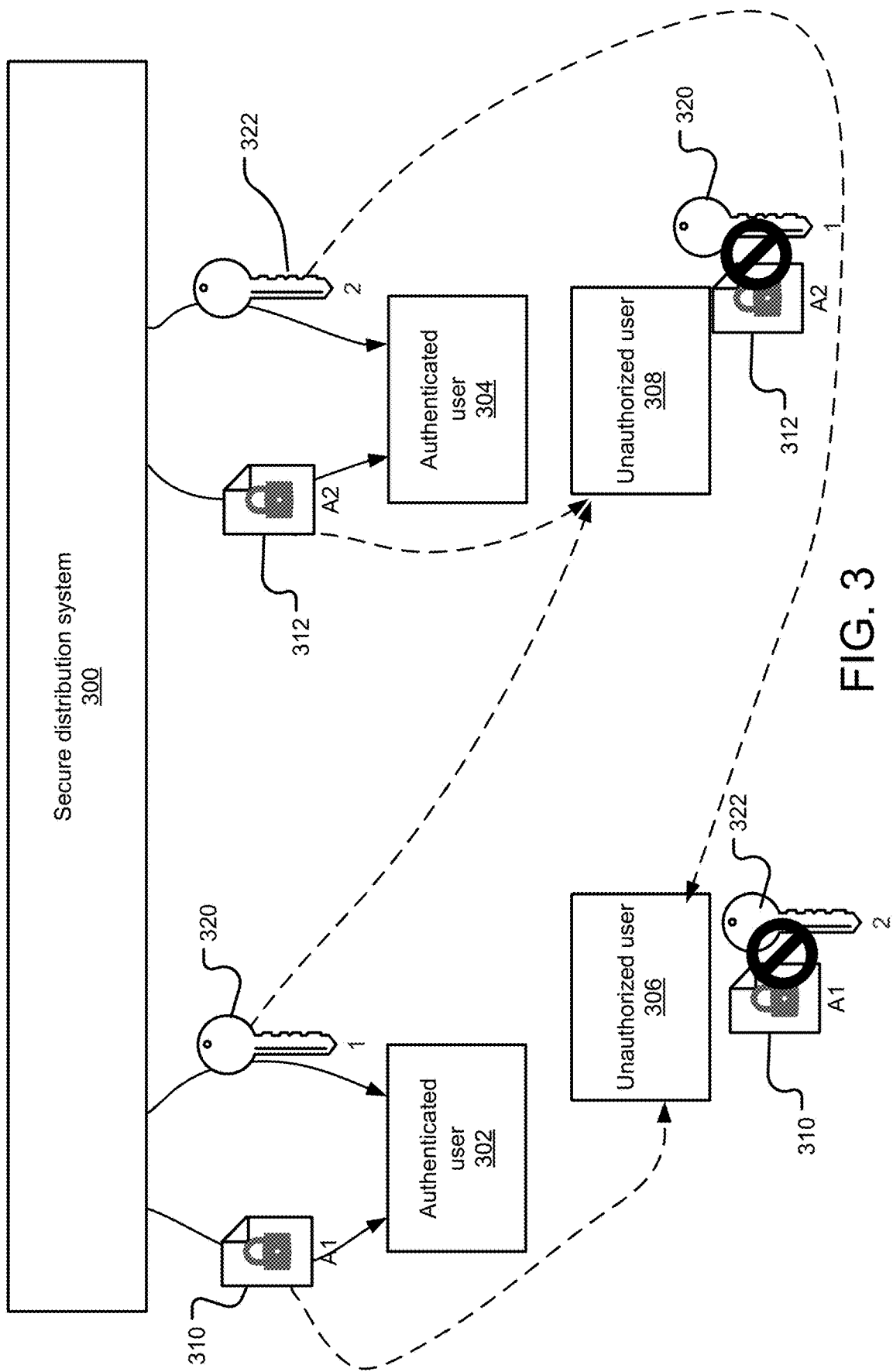
FIG. 3 depicts examples of scenarios in which unauthorized access is precluded based on obtaining an encrypted data object or a quantum-safe cryptographic key.

FIG. 3 illustrates various scenarios that illustrate enhanced security provided by a unique quantum-safe cryptographic key correspondingly associated with a data object instance as provided herein. As shown in FIG. 3, an authenticated user 302 may authenticate to a secure distribution system 300. The authenticated user 302 may receive an encrypted data object A1 310 and a unique quantum-safe cryptographic key 1 320, as described above in relation to FIGS. 1-2. The unique quantum-safe cryptographic key 1 320 may be unique to the encrypted data object A1 310, as described above. Also, another authenticated user 304 may also authenticate to the secure distribution system 300. The authenticated user 304 may receive an encrypted data object A2 312 and a unique quantum-safe cryptographic key 2 322 as described above in relation to FIGS. 1-2. The unique quantum-safe cryptographic key 2 322 may be unique to the encrypted data object A2 312, as described above. In this regard, the encrypted data object A1 310 and the encrypted data object A2 312 may both be instances of a single data object A, but each encrypted with unique quantum-safe cryptographic keys.

While communications between the secure distribution system 300 and the user 302 are preferably secure and resistant to surreptitious access by an unauthorized user, a hypothetical unauthorized user 306 may gain access to the encrypted data object A1 310. Such may occur through an attack on the authorized user 302, by intercepting the encrypted data object A1 310 in transit, or potentially some other surreptitious means. Furthermore, the unauthorized user 306 may gain access to the encrypted data object A2 312 by some surreptitious means. However, given the unauthorized user 306 would have quantum-safe cryptographic key 2 322 and encrypted data object A1 310, the encrypted data object 310 would still not be accessible by the unauthorized user 306 because the encrypted data object A1 310 may be uniquely encrypted using the quantum-safe cryptographic key 1 320. Similarly, another unauthorized user 308 may gain access to the quantum-safe cryptographic key 1 320 and encrypted data object A2 312. Again, unauthorized user 308 may be unable to decrypt the encrypted data object A2 312 using the quantum-safe cryptographic key 2 320 as the key is not the unique cryptographic key 2 322 uniquely matched to the encrypted data object A2 312. In this regard, use of a unique cryptographic key that is exclusively operative to decrypt the specific instance of the encrypted data object to which the key is associated provides enhanced security even in contexts where an unauthorized third party gains access to a key and/or data object provided from the system.

As briefly mentioned above, a secure distribution system may also receive data objects from authorized users to allow such uploaded data objects to be stored at the secure distribution system. In some contexts, the uploaded data object may comprise an altered data object that has previously been received from a secure distribution system. Accordingly, subsequent requests for the data object may be provided with a unique quantum-safe cryptographic key (e.g., a new unique quantum-safe cryptographic key that is uniquely provided for the subsequent instance of the altered or uploaded data object to be provided to an authorized user fo the system.

Figure 4:
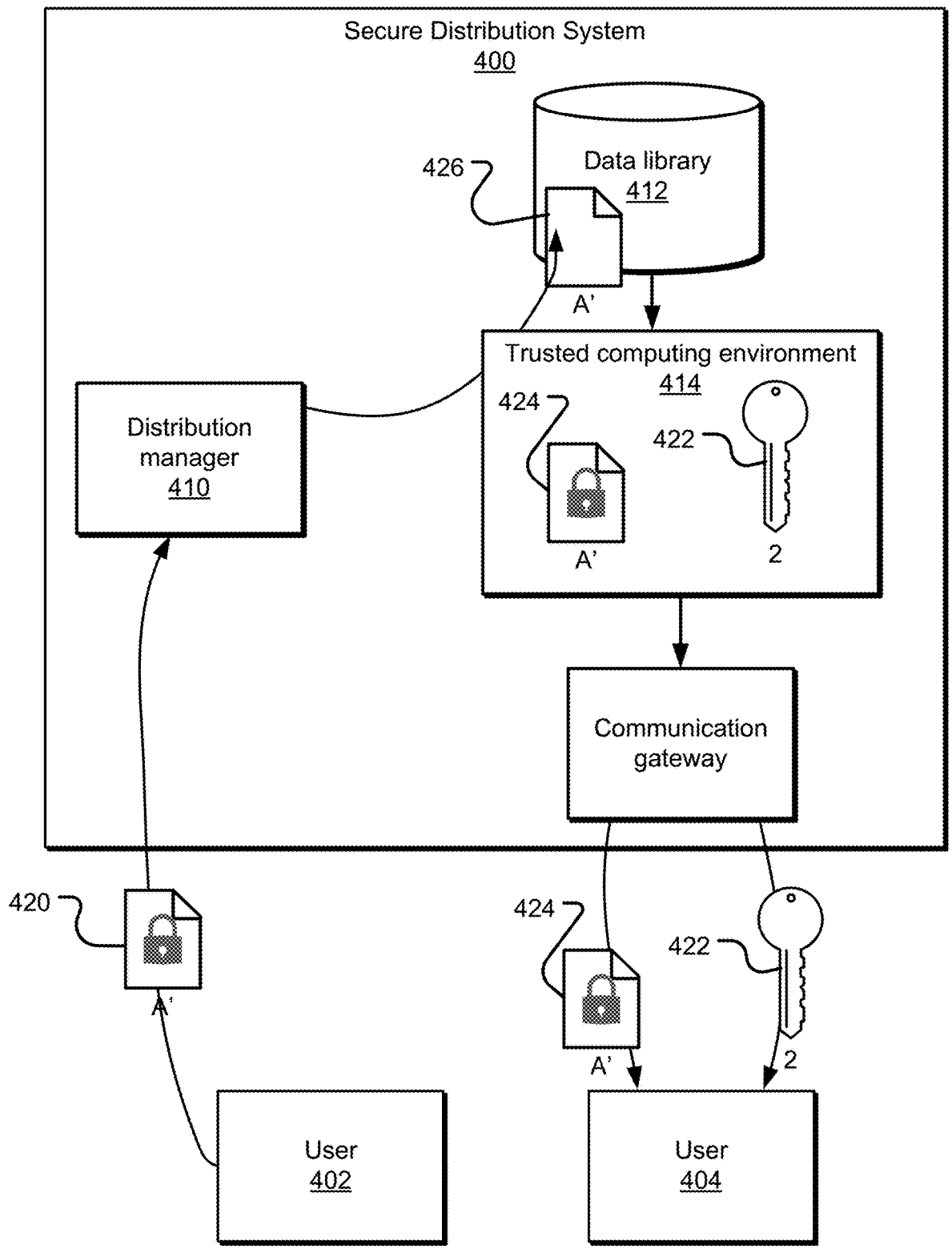
FIG. 4 depicts an example of a secure distribution system to receive an altered data object for subsequent distribution according to the present disclosure.

Such a transaction is illustrated in FIG. 4. In FIG. 4, a user 402 may authenticate to the secure distribution system 400. The user 402 may provide a data object 420 to the secure distribution system 400. In one example, the data object 420 may correspond to data object A that has previously been retrieved from the secure distribution system 400. As the user 402 may have modified the data object, the returned encrypted data object 420 may comprise an altered data object A'. The user 402 may encrypt the data object 420 with a unique quantum-safe cryptographic key (not shown) that was provided when the data object 420 was previously received. In this regard, the secure distribution system 400 (e.g., the TCE 414) may be capable of decrypting the encrypted data object 420 as a record of the unique quantum-safe cryptographic key associated with the instance of the data object 420 received from the user 402 may be identified. In other examples, other encryption techniques may be utilized without limitation.

In any regard, the distribution manager 410 may pass the encrypted data object 420 to the data library 412 for storage therein. The altered data object A' 426 may be stored in the data library 412. Another authorized user 404 (which may be the same or different than user 402) may subsequently request access to the altered data object A' 426 from the data library 412. Accordingly, an instance of the altered data object A' 426 may be provided to a TCE 414. A unique quantum-safe cryptographic key 422 may be associated with the instance of the altered data object 426 and may be used to encrypt the data object 426 to create an encrypted altered data object 424. In turn, the encrypted altered data object 424 and the unique quantum-safe cryptographic key 422 used to encrypt the encrypted altered data object 424 may be provided to the another user 404.

Figure 5:
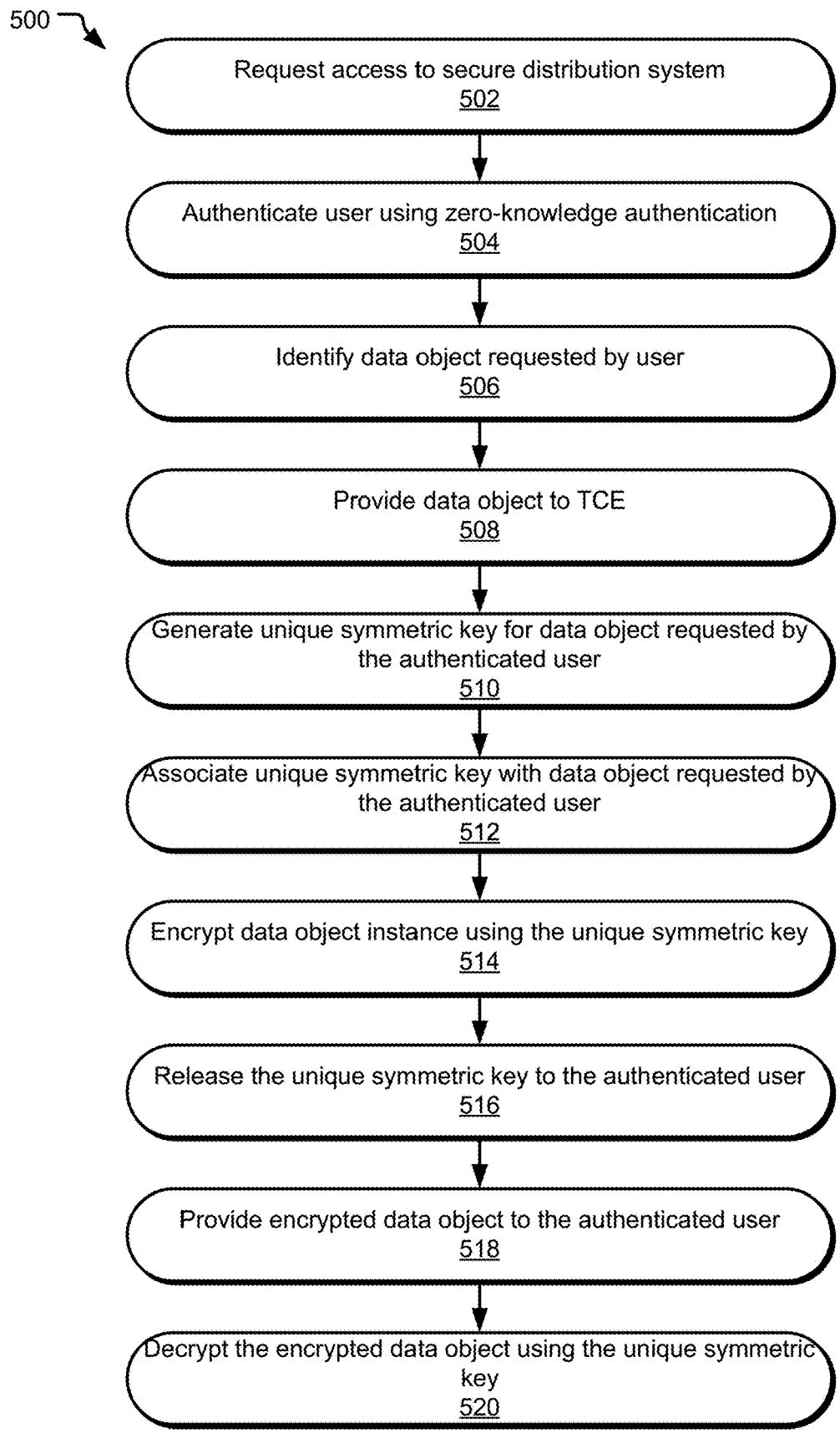
FIG. 5 depicts example operations for the use of a secure distribution system according to the present disclosure.

FIG. 5 illustrates example operations 500 for a secure distribution system. A requesting operation 502 includes requesting access to the secure distribution system from a user. From the perspective of the secure distribution system, the requesting operation 502 may include receiving a request from the user to access the secure distribution system. An authenticating operation 504 authenticates the user using a zero-knowledge authentication protocol, as described above. In turn, an identifying operation 506 identifies a data object requested by the authenticated user from a data library of the secure distribution system. From the perspective of the secure distribution system, the identifying operation 506 may include receiving the request for the data object from the user and locating the requested data object in the data library.

A providing operation 508 provides the requested data object to a TCE of the secure distribution system. The providing operation 508 may include moving the data object from the data library to the TCE or copying the data object to the TCE. In any regard, an instance of the data object is provided to the TCE for processing that will be provided to the authorized requesting user. A generating operation 510 generates a unique quantum-safe cryptographic key. Alternatively, the operations 500 may include accessing a unique quantum-safe cryptographic key that has previously been generated and stored but has not yet been associated with a data object provided to a user from the system. In any regard, an associating operation 512 associates the unique quantum-safe cryptographic key with the data object instance provided in the providing operation 508. An encrypting operation 514 includes encrypting the instance of the data object with the unique quantum-safe cryptographic key.

A releasing operation 516 releases the unique quantum-safe cryptographic key to the authorized user. The releasing operation 516 may include providing the unique quantum-safe cryptographic key to a communication gateway for forwarding the unique quantum-safe cryptographic key to the authorized user in the manner described above. In addition, a providing operation 518 may provide the encrypted data object to the authenticated user. For example, the providing operation 518 may include providing the encrypted data object to the communications gateway to provide the encrypted data object to the user. In turn, a decrypting operation 520 may be facilitated in which the user may decrypt the encrypted data object using the unique quantum-safe cryptographic key.

Figure 6:
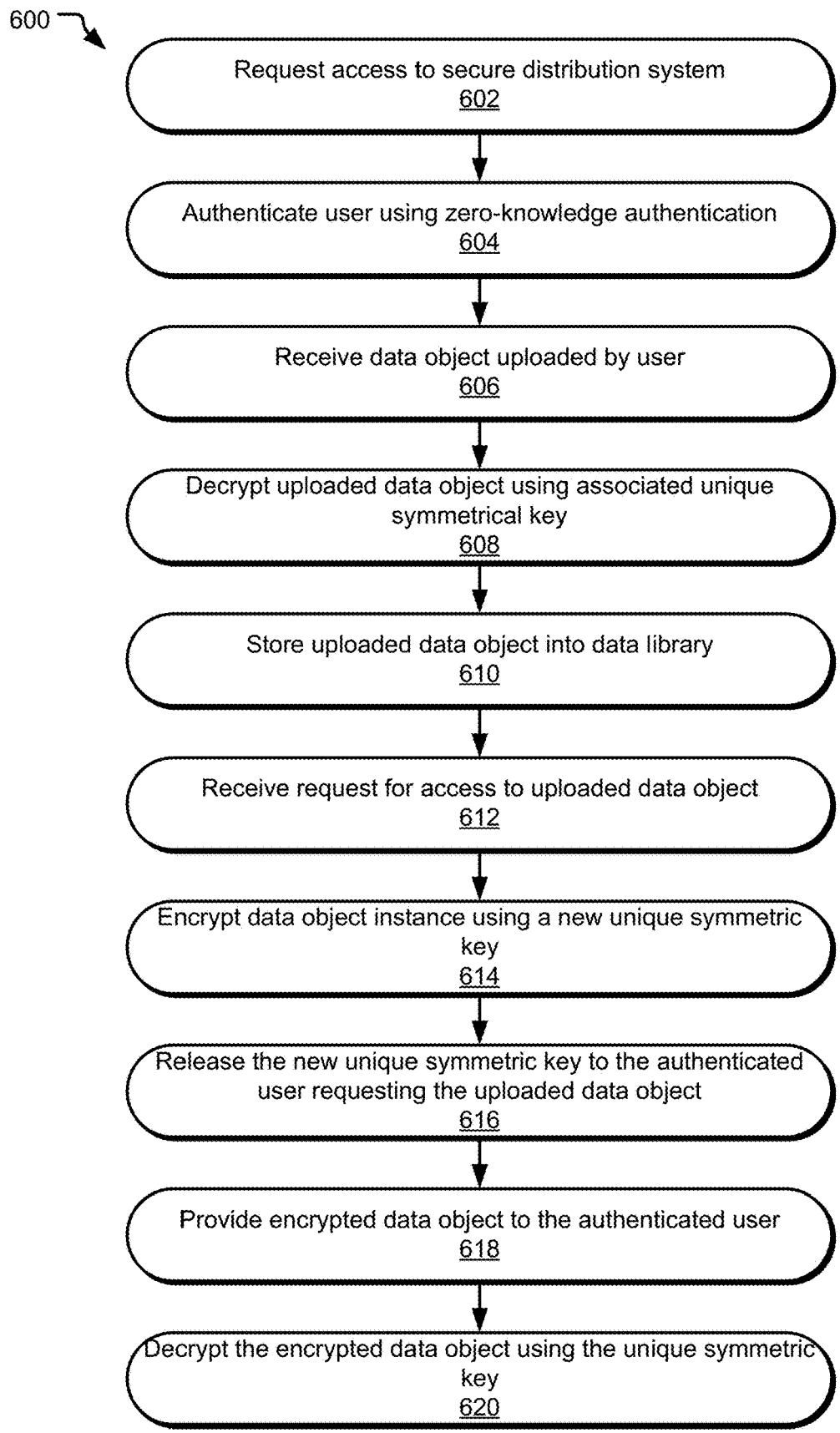
FIG. 6 depicts example operations for receiving a data object from an authorized user for subsequent distribution using the system.

FIG. 6 includes example operations 600 related to the processing of an altered data object received from an authorized user. A requesting operation 602 includes a user requesting access to the secure distribution system. From the perspective of the secure distribution system, the requesting operation 602 may include receiving a request from the user to access the secure distribution system. An authenticating operation 604 authenticates a user using a zero-knowledge authentication protocol, as described above. Upon authentication of the user in the authenticating operation 604, a receiving operation 606 may receive a data object uploaded by an authenticated user. A decrypting operation 608 may decrypt an uploaded data object if the data object is encrypted. For example, as described above, a user may encrypt an uploaded data object using a previously acquired unique quantum-safe cryptographic key received from the secure distribution system that was provided in relation to accessing the data object. As such, the decrypting operation 608 may include accessing the associated unique cryptographic key for the data object that is uploaded. Alternative approaches to decryption of the data object may be utilized without limitation.

A storing operation 610 may store the uploaded data object to a data library of the secure distribution system. In turn, a receiving operation 612 may receive a request for access to the uploaded data object now stored in the data library. An encrypting operation 614 may be used to encrypt the uploaded data object using a new unique quantum-safe cryptographic key. The new unique quantum-safe cryptographic key may be associated with the uploaded data object. In turn, a releasing operation 616 may release the unique quantum-safe cryptographic key to the authenticated user. Also, a providing operation 618 may provide the encrypted data object to the authenticated user. In turn, a decrypting operation 620 may be facilitated in which the user may decrypt the encrypted data object using the unique quantum-safe cryptographic key.

Figure 7:
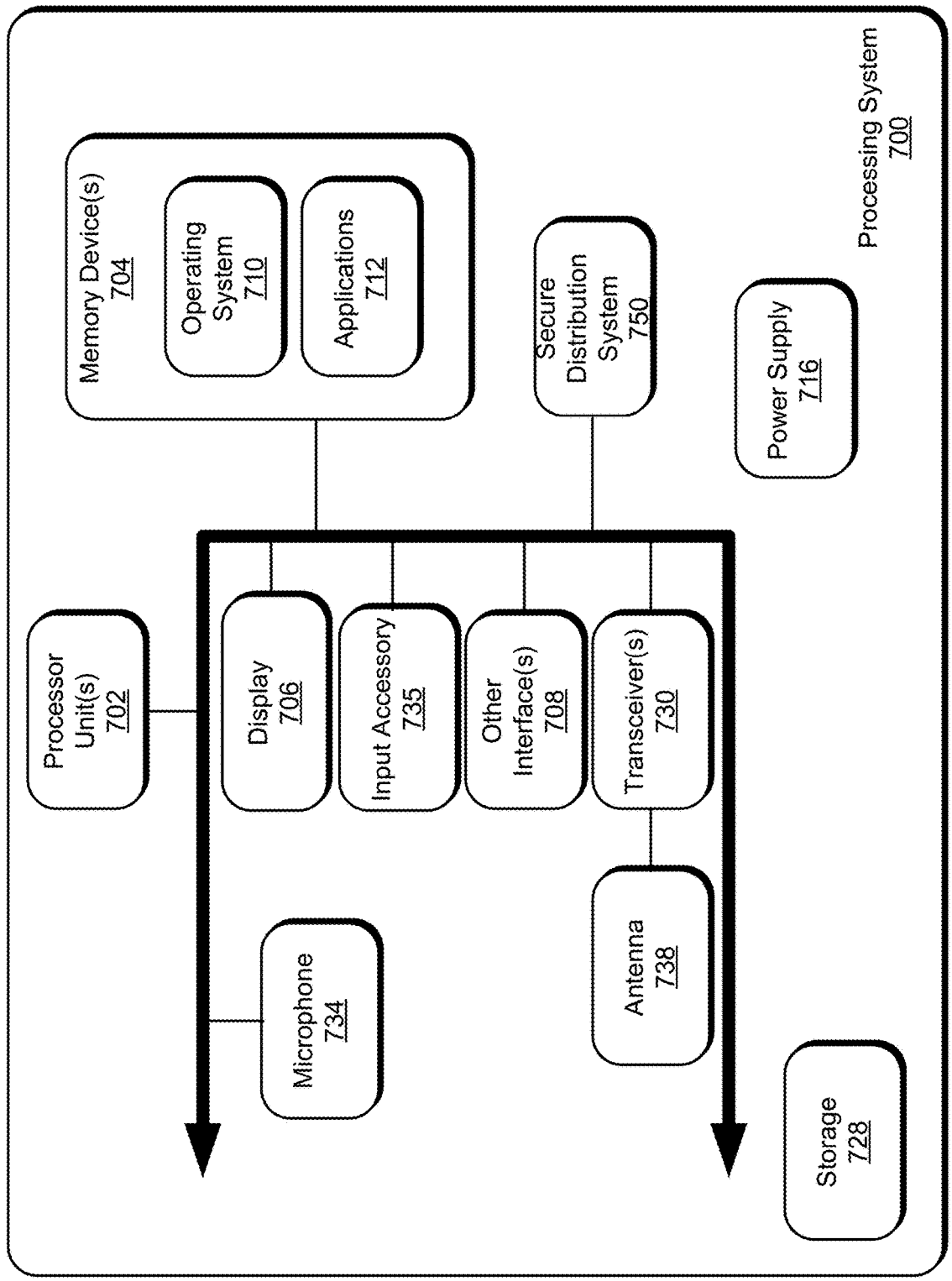
FIG. 7 depicts a processing device that may be used for the execution of the secure distribution system described herein.

FIG. 7 illustrates an example schematic of a processing system 700 suitable for implementing aspects of the disclosed technology, including a secure distribution system 750 as described above. The processing system 700 includes one or more processor unit(s) 702, memory 704, a display 706, and other interfaces 708 (e.g., buttons). The memory 704 generally includes both volatile memory (e.g., RAM) and non-volatile memory (e.g., flash memory). An operating system 710, such as the Microsoft Windows® operating system, the Apple macOS operating system, or the Linux operating system, resides in the memory 704 and is executed by the processor unit(s) 702, although it should be understood that other operating systems may be employed.

One or more applications 712 are loaded in the memory 704 and executed on the operating system 710 by the processor unit(s) 702. Applications 712 may receive input from various input local devices such as a microphone 734, input accessory 735 (e.g., keypad, mouse, stylus, touchpad, joystick, an instrument mounted input, or the like). Additionally, the applications 712 may receive input from one or more remote devices such as remotely-located smart devices by communicating with such devices over a wired or wireless network using more communication transceivers 730 and an antenna 738 to provide network connectivity (e.g., a mobile phone network, Wi-Fi®, Bluetooth®). The processing device 700 may also include various other components, such as a positioning system (e.g., a global positioning satellite transceiver), one or more accelerometers, one or more cameras, an audio interface (e.g., the microphone 734, an audio amplifier and speaker and/or audio jack), and storage devices 728. Other configurations may also be employed.

The processing system 700 further includes a power supply 716, which is powered by one or more batteries or other power sources and which provides power to other components of the processing system 700. The power supply 716 may also be connected to an external power source (not shown) that overrides or recharges the built-in batteries or other power sources.

In an example implementation, a secure distribution system 750 may include hardware and/or software embodied by instructions stored in the memory 704 and/or the storage devices 728 and processed by the processor unit(s) 702. The memory 704 may be the memory of a host device or of an accessory that couples to the host.

The processing system 700 may include a variety of tangible processor-readable storage media and intangible processor-readable communication signals. Tangible processor-readable storage can be embodied by any available media that can be accessed by the processing system 700 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 700. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means an intangible communications signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a specific operation segment. The instructions may be implemented using any suitable high-level, low-level, object-oriented, visual, compiled, and/or interpreted programming language.

One general aspect of the present disclosure includes a method for the secure distribution of a data object. The method includes authenticating a user using a zero-knowledge authentication protocol. The method also includes associating a unique quantum-safe cryptographic key with a data object requested by the authenticated user and encrypting the data object with the unique quantum-safe cryptographic key. The method includes releasing the unique quantum-safe cryptographic key to the authenticated user and providing access to the encrypted data object to the authenticated user. The unique quantum-safe cryptographic key being exclusively operative to decrypt the encrypted data object.

Implementations may include one or more of the following features. For example, the data object includes a data package. In this regard, the providing may include communicating the data package to the authenticated user using a communications network. Alternatively, the data object may include a physical data storage media. In this case, the providing may include delivering the physical data storage media to the authenticated user.

In an example, the zero-knowledge authentication protocol comprises a protocol corresponding to one of IETF RFC 2945, IEEE P1363.2, or ISO-IEC 11770-4.

In an example, the method also includes receiving an altered data object from the authenticated user corresponding to the data object and storing the altered data object in a data library. In this regard, the method may include authenticating a second user using a zero-knowledge authentication protocol and associating a second unique quantum-safe cryptographic key with the altered data object requested by the second authenticated user. The second unique quantum-safe cryptographic key is different than the unique quantum-safe cryptographic key. The method may include encrypting the altered data object with the second unique quantum-safe cryptographic key. In turn, the method may include releasing the second unique quantum-safe cryptographic key to the second authenticated user and providing access to the encrypted altered data object to the second authenticated user. The second unique quantum-safe cryptographic key is exclusively operative to decrypt the encrypted altered data object.

In an example, the unique quantum-safe cryptographic key may be uniquely matched with an instance of the encrypted data object provided to the authenticated user. The unique quantum-safe cryptographic key may include a symmetric key.

Another aspect of the present disclosure includes a system for the secure distribution of one or more data objects. The system includes a data library comprising at least one data object stored in a secure data space. The system also includes an authentication module, executed by a hardware processor of the system, to authenticate a user using a zero-knowledge authentication protocol. The system includes a trusted computing environment. The trusted computing environment is operative to associate a unique quantum-safe cryptographic key with a data object of the data library in response to a request for the data object from the authorized user. The unique quantum-safe cryptographic key is exclusively operative to decrypt the encrypted data object. The trusted computing environment is also operative to encrypt the encrypting the data object with the unique quantum-safe cryptographic key and release the unique quantum-safe cryptographic key to the authenticated user. The system also includes a communication gateway for providing authenticated user access to the encrypted data object.

Implementations may include one or more of the following features. For example, the data object may include a data package, and the communication gateway may communicate the data package to the authenticated user using a communications network. Alternatively, the data object may be a physical data storage media, and the communication gateway may be operative to deliver the physical data storage media to the authenticated user.

In an example, the zero-knowledge authentication protocol comprises a protocol corresponding to one of IETF RFC 2945, IEEE P1363.2, or ISO-IEC 11770-4.

In another example, the communication gateway is operative to receive an altered data object from the authenticated user corresponding to the data object. In turn, the altered data object is stored in the data library. Accordingly, the authentication module may be operative to authenticate a second user using a zero-knowledge authentication protocol. The trusted computing environment may be further operative to associate a second unique quantum-safe cryptographic key with the altered data object requested by the second authenticated user, encrypt the altered data object with the second unique quantum-safe cryptographic key, and releasing the second unique quantum-safe cryptographic key to the second authenticated user. The second unique quantum-safe cryptographic key is exclusively operative to decrypt the encrypted altered data object, and the second unique quantum-safe cryptographic key is different than the unique quantum-safe cryptographic key. Further still, the communication gateway may be operative to provide the second authenticated user access to the encrypted altered data object.

In an example, the unique quantum-safe cryptographic key may be a uniquely matched symmetric cryptographic key with an instance of the encrypted data object provided to the authenticated user.

Another aspect of the present disclosure includes one or more tangible processor-readable storage media embodied with instructions for executing on one or more processors and circuits of a device a process for secure distribution of a data object. The process includes authenticating a user using a zero-knowledge authentication protocol. The process also includes associating a unique quantum-safe cryptographic key with a data object requested by the authenticated user and encrypting the data object with the unique quantum-safe cryptographic key. The process further includes releasing the unique quantum-safe cryptographic key to the authenticated user and providing access to the encrypted data object to the authenticated user. The unique quantum-safe cryptographic key is exclusively operative to decrypt the encrypted data object.

Implementations may include one or more of the following features. For example, the data object comprises a data package, and the providing comprises communicating the data package to the authenticated user using a communications network. In another example, the data object may be a physical data storage media, and the providing includes delivering the physical data storage media to the authenticated user.

In an example, the zero-knowledge authentication protocol comprises a protocol corresponding to one of IETF RFC 2945, IEEE P1363.2, or ISO-IEC 11770-4.

In another example, the process further includes receiving an altered data object from the authenticated user corresponding to the data object and storing the altered data object in a data library. In turn, the process may also include authenticating a second user using a zero-knowledge authentication protocol. The process may include associating a second unique quantum-safe cryptographic key with the altered data object requested by the second authenticated user. The second unique quantum-safe cryptographic key is different than the unique quantum-safe cryptographic key. The process may include encrypting the altered data object with the second unique quantum-safe cryptographic key. The process may also include releasing the second unique quantum-safe cryptographic key to the second authenticated user and providing access to the encrypted altered data object to the second authenticated user. The second unique quantum-safe cryptographic key is exclusively operative to decrypt the encrypted altered data object.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order unless explicitly claimed otherwise or a specific order is inherently necessitated by the claim language.

What is claimed is:

1. A method for secure distribution of a data object, comprising:
   authenticating a user using a zero-knowledge authentication protocol;
   associating a unique quantum-safe cryptographic key with a data object requested by the authenticated user, wherein the unique quantum-safe cryptographic key is unique with respect to both the data object requested and an identity of the authenticated user;
   encrypting the data object with the unique quantum-safe cryptographic key;
   releasing the unique quantum-safe cryptographic key to the authenticated user; and
   providing access to the encrypted data object to the authenticated user, the unique quantum-safe cryptographic key being exclusively operative to decrypt the encrypted data object;
   wherein the unique quantum-safe cryptographic key is provided to the authenticated user using a separate channel having different communication path to the authenticated user than a channel used to provide the encrypted data object to the authenticated user.

2. The method of claim 1, wherein the data object comprises a data package, and the providing comprises communicating the data package to the authenticated user using a communications network.

3. The method of claim 1, wherein the data object comprises physical data storage media, and the providing comprises delivering the physical data storage media to the authenticated user.

4. The method of claim 1, wherein the zero-knowledge authentication protocol comprises a protocol corresponding to one of IETF RFC 2945, IEEE P1363.2, or ISO-IEC 11770-4.

5. The method of claim 1, further comprising:
   receiving an altered data object from the authenticated user corresponding to the data object; and
   storing the altered data object in a data library.

6. The method of claim 5, further comprising:
   authenticating a second user using a zero-knowledge authentication protocol;
   associating a second unique quantum-safe cryptographic key with the altered data object requested by the second authenticated user, the second unique quantum-safe cryptographic key being different than the unique quantum-safe cryptographic key;
   encrypting the altered data object with the second unique quantum-safe cryptographic key;
   releasing the second unique quantum-safe cryptographic key to the second authenticated user; and
   providing access to the encrypted altered data object to the second authenticated user, the second unique quantum-safe cryptographic key being exclusively operative to decrypt the encrypted altered data object.

7. The method of claim 1, wherein the unique quantum-safe cryptographic key is uniquely matched with an instance of the encrypted data object provided to the authenticated user.

8. The method of claim 1, wherein the unique quantum-safe cryptographic key comprises a symmetric key.

9. The method of claim 1, wherein the unique quantum-safe cryptographic key is generated using a non-quantum-based approach comprising at least one of lattice-based cryptography, multivariate cryptography, hash-based cryptography, code-based cryptography, and supersingular elliptical curve isogeny cryptography.

10. A system for secure distribution of one or more data objects, comprising:
    a data library comprising at least one data object stored in a secure data space;
    an authentication module, executed by a hardware processor of the system, to authenticate a user using a zero-knowledge authentication protocol;
    a trusted computing environment operative to:
      associate a unique quantum-safe cryptographic key with a data object of the data library in response to a request for the data object from the authorized user, wherein the unique quantum-safe cryptographic key is unique with respect to both the data object requested and an identity of the authenticated user,
      encrypt the encrypting the data object with the unique quantum-safe cryptographic key, the unique quantum-safe cryptographic key being exclusively operative to decrypt the encrypted data object, and
      release the unique quantum-safe cryptographic key to the authenticated user; and
    a communication gateway for providing authenticated user access to the encrypted data object, wherein the unique quantum-safe cryptographic key is provided to the authenticated user using a separate channel different having different communication path to the authenticated user than a channel used to provide the encrypted data object to the authenticated user.

11. The system of claim 10, wherein the data object comprises a data package, and the communication gateway communicates the data package to the authenticated user using a communications network.

12. The system of claim 10, wherein the data object comprises physical data storage media, and the communication gateway is operative to deliver the physical data storage media to the authenticated user.

13. The system of claim 10, wherein the zero-knowledge authentication protocol comprises a protocol corresponding to one of IETF RFC 2945, IEEE P1363.2, or ISO-IEC 11770-4.

14. The system of claim 10, wherein the communication gateway is operative to receive an altered data object from the authenticated user corresponding to the data object, the altered data object being stored in the data library.

15. The system of claim 14, wherein
the authentication module is operative to authenticate a second user using a zero-knowledge authentication protocol;
the trusted computing environment is operative to associate a second unique quantum-safe cryptographic key with the altered data object requested by the second authenticated user, encrypt the altered data object with the second unique quantum-safe cryptographic key, and releasing the second unique quantum-safe cryptographic key to the second authenticated user, the second unique quantum-safe cryptographic key being exclusively operative to decrypt the encrypted altered data object and the second unique quantum-safe cryptographic key is different than the unique quantum-safe cryptographic key; and
the communication gateway is operative to provide the second authenticated user access to the encrypted altered data object.

16. The system of claim 10, wherein the unique quantum-safe cryptographic key is a uniquely matched symmetric cryptographic key with an instance of the encrypted data object provided to the authenticated user.

17. The system of claim 10, wherein the unique quantum-safe cryptographic key is generated using a non-quantum-based approach comprising at least one of lattice-based cryptography, multivariate cryptography, hash-based cryptography, code-based cryptography, and supersingular elliptical curve isogeny cryptography.

18. One or more tangible processor-readable storage media embodied with instructions for executing on one or more processors and circuits of a device a process for secure distribution of a data object, comprising:
authenticating a user using a zero-knowledge authentication protocol;
associating a unique quantum-safe cryptographic key with a data object requested by the authenticated user, wherein the unique quantum-safe cryptographic key is unique with respect to both the data object requested and an identity of the authenticated user;
encrypting the data object with the unique quantum-safe cryptographic key;
releasing the unique quantum-safe cryptographic key to the authenticated user; and
providing access to the encrypted data object to the authenticated user, the unique quantum-safe cryptographic key being exclusively operative to decrypt the encrypted data object;
wherein the unique quantum-safe cryptographic key is provided to the authenticated user using a separate channel having different communication path to the authenticated user different than a channel used to provide the encrypted data object to the authenticated user.

19. The one or more tangible processor-readable storage media of claim 18, wherein the data object comprises a data package, and the providing comprises communicating the data package to the authenticated user using a communications network.

20. The one or more tangible processor-readable storage media of claim 18, wherein the data object comprises physical data storage media, and the providing comprises delivering the physical data storage media to the authenticated user.

21. The one or more tangible processor-readable storage media of claim 18, wherein the zero-knowledge authentication protocol comprises a protocol corresponding to one of IETF RFC 2945, IEEE P1363.2, or ISO-IEC 11770-4.

22. The one or more tangible processor-readable storage media of claim 18, further comprising:
receiving an altered data object from the authenticated user corresponding to the data object; and
storing the altered data object in a data library.

23. The one or more tangible processor-readable storage media of claim 22, further comprising:
authenticating a second user using a zero-knowledge authentication protocol;
associating a second unique quantum-safe cryptographic key with the altered data object requested by the second authenticated user, the second unique quantum-safe cryptographic key being different than the unique quantum-safe cryptographic key;
encrypting the altered data object with the second unique quantum-safe cryptographic key;
releasing the second unique quantum-safe cryptographic key to the second authenticated user; and
providing access to the encrypted altered data object to the second authenticated user, the second unique quantum-safe cryptographic key being exclusively operative to decrypt the encrypted altered data object.

24. The one or more tangible processor-readable storage media of claim 18, wherein the unique quantum-safe cryptographic key is generated using a non-quantum-based approach comprising at least one of lattice-based cryptography, multivariate cryptography, hash-based cryptography, code-based cryptography, and supersingular elliptical curve isogeny cryptography.

* * * * *